United States Patent
Goodbred

(10) Patent No.: US 6,948,693 B2
(45) Date of Patent: Sep. 27, 2005

(54) VEHICLE SEAT ADJUSTER

(75) Inventor: Neil G. Goodbred, Northville, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/638,881

(22) Filed: Aug. 11, 2003

(65) Prior Publication Data

US 2005/0035261 A1 Feb. 17, 2005

(51) Int. Cl.$^7$ ............................................... F16M 13/00
(52) U.S. Cl. ........................ 248/429; 248/424; 74/89.15
(58) Field of Search ................................. 248/424, 429; 74/89.15, 424.8, 89

(56) References Cited

U.S. PATENT DOCUMENTS

| | | | | |
|---|---|---|---|---|
| 5,048,786 A | * | 9/1991 | Tanaka et al. ............... 248/429 |
| 5,467,957 A | * | 11/1995 | Gauger ........................ 248/429 |
| 5,711,184 A | | 1/1998 | Pryor et al. ................ 74/89.15 |
| 5,797,293 A | | 8/1998 | Chaban ....................... 248/429 |
| 5,797,576 A | * | 8/1998 | Gauger ........................ 248/429 |
| 5,816,555 A | * | 10/1998 | Ito et al. ..................... 248/429 |
| 5,860,319 A | | 1/1999 | Via ............................ 74/89.15 |
| 6,220,642 B1 | * | 4/2001 | Ito et al. .................. 296/65.14 |
| 6,244,660 B1 | * | 6/2001 | Yoshimatsu .............. 297/344.1 |
| 6,575,421 B1 | | 6/2003 | Houston et al. ............ 248/429 |
| 2003/0173809 A1 | | 9/2003 | Moradell et al. ........ 297/344.1 |

* cited by examiner

Primary Examiner—Leslie A. Braun
Assistant Examiner—A. Joseph Wujciak
(74) Attorney, Agent, or Firm—MacMillan, Sobanski & Todd, LLC

(57) ABSTRACT

A vehicle seat adjuster has a first track member attached to a vehicle frame and a second track member attached to a vehicle seat and is movable relative to the first track. The adjuster includes a drive mechanism, having a threaded shaft connected with the second track member, a drive block attached to the first track member, and means for moving the threaded shaft within the drive block, for moving the track members. The drive block is made of a base, an isolator made of a urethane material, and a nut. The isolator fits within an opening on the base, and the nut fits within an opening within the isolator. Each of the components has a bore formed therethrough such that the threaded shaft can pass through the drive block. The isolator and the nut are pivotable within the base component in order to maintain alignment between the shaft and the drive block.

14 Claims, 4 Drawing Sheets

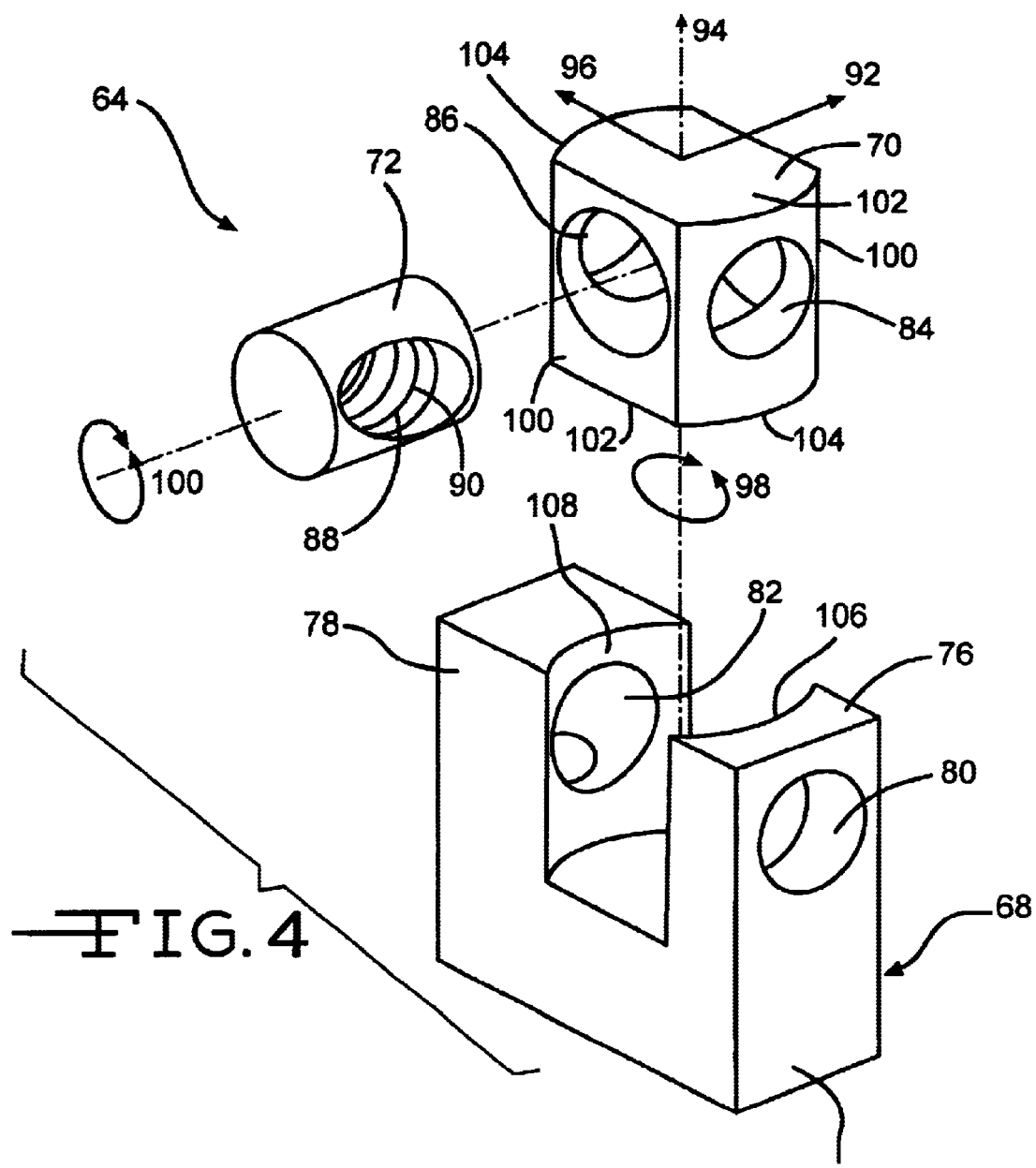
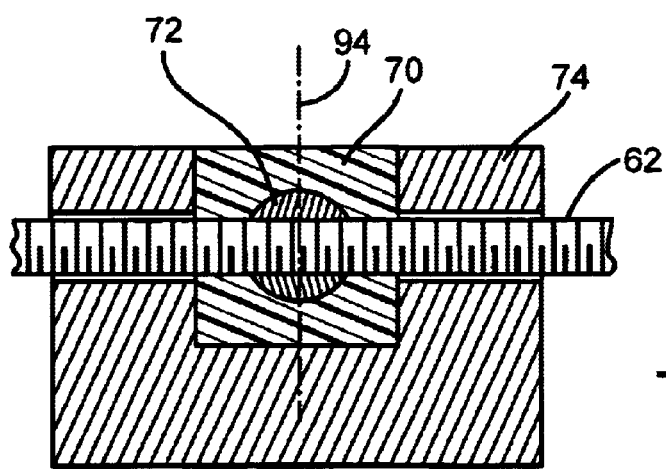

VEHICLE SEAT ADJUSTER

FIELD OF THE INVENTION

This invention relates in general to a seat track assembly for a vehicle, and in particular to a seat track assembly that is adjustable in a fore or aft direction by a vehicle seat adjuster mechanism.

BACKGROUND OF INVENTION

Most vehicle seats, particularly in passenger vehicles, are generally provided with adjustment mechanisms to allow a seat occupant to position the seat for optimal comfort and convenience. A vehicle seat typically includes a seat back that is mounted with a seat bottom. Many vehicle seats also include a recliner mechanism to adjust the angle of the seat back relative to the seat bottom. Vehicle seats can also include mechanisms that allow movement of the seat forward and backward (fore and aft) relative to the floor of the vehicle. To accomplish this, vehicle seats are mounted on a seat support frame that is mounted on first and second spaced apart track assemblies. Each assembly has an upper track connected to the seat support frame that is slidably mounted on a lower track that is fixed to the vehicle floor with a low-friction member or surface between the tracks. The fore and aft axes correspond to a generally horizontal longitudinal direction relative to the vehicle and generally move the seat closer or father away from the steering wheel and operating pedals of the vehicle. A power seat adjuster can be used to control a motor for operating a mechanism that can move the seat on the tracks. The power seat adjuster can also be operated to adjust the seat in a generally vertical or elevational direction. Generally, power seat adjusters control the elevation of the front and rear portions of the seat bottom separately. Thus, the typical power seat adjuster can be operated to adjust the seat in generally three axes: 1) fore and aft; 2) front elevation; and 3) rear elevation.

It is common for such vehicle seat adjustments to be accomplished by manually or electrically controlled mechanical devices using gears, screws, and bell cranks. The limitations of manually controlled seat adjusters is that there are a finite number of positions or stops along a seat track in which the seat can be positioned. These systems also commonly require an individual to reach down to the side or bottom of a seat to activate the release mechanism for adjustment. With power seat adjusters, a motor generally is used to operate a rack and pinion or gear system to cause movement of the seat. A power seat adjuster system is easier to use and allows for greater distance or position control than with a manual system.

A drive mechanism for operating the fore and aft motion of a power seat adjuster typically includes an electric motor which bi-directionally rotates a pair of drive shafts extending outward from the motor to a gear assembly or box mounted on each upper track. A drive block is fixedly mounted to each lower track and threadingly receives a lead screw or threaded shaft to cause reciprocal horizontal movement of the upper track and the attached seat support frame relative to the lower track that is fixed to the vehicle when the drive motor is activated. Steel gimbal drive blocks are known to be used for maintaining alignment between the shaft and drive block. Steel gimbals are difficult to manufacture because of the metal to metal contact they are prone to chuck and rattle. Chucking is typically considered to be undesirable fore and aft play within the mechanism. Additionally, steel on steel gimbals are difficult to align and thus, are prone to squeal. Thus, it would be advantageous to utilize an improved assembly for seat positioning that has self-aligning characteristics while having a low vibration (low noise) transmissivity.

SUMMARY OF THE INVENTION

This invention relates to a vehicle seat adjuster mechanism that has a first track member attached to a vehicle frame, and a second track member attached to the vehicle seat. The second track member is slidably movable relative to the first track. The adjuster also includes an electrically controlled drive mechanism for moving the second track member. The drive mechanism includes a threaded shaft connected with the second track member, a drive block attached to the first track member, and means for moving the threaded shaft within the drive block. The drive block is a three-piece gimbal drive block. The drive block is made of a base component, an isolator component made of a urethane material, and a nut. The isolator fits within an opening formed on the base component, and the nut fits within an opening formed within the isolator component. Each of the components has a bore formed therethrough so that the threaded shaft can pass through the drive block. The bore formed in the nut is threaded to correspond with the threads of the shaft to facilitate such movement. The isolator and the nut are pivotable within the base component in order to maintain alignment between the shaft and the drive block.

Various objects and advantages of this invention will become apparent to those skilled in the art from the following detailed description of the preferred embodiment, when read in light of the accompanying drawings.

BRIEF DESCRIPTION OF THE DRAWINGS

FIG. 4 is an exploded view of the drive block assembly used with the vehicle seat adjuster according to the present invention.

FIG. 5 is a cross sectional view of the drive block assembly of FIG. 4, through line 5—5.

DETAILED DESCRIPTION OF THE PREFERRED EMBODIMENT

Preliminarily, it should be noted that the term "gimbal" is meant to include a mechanism for permitting a body to incline freely in all directions so that it will remain plumb, or level, when its support is tipped. It consists of a component in which a body can turn on an axis through a diameter of the component, while the component itself is so pivoted to its support that it can turn about a diameter at right angles to the first. It can be appreciated that such a joint is similar to a ball and socket joint, universal joint (such as one that is used at the end of a driveshaft on a vehicle), or any other joint that allows two or more components to remain aligned while transmitting power.

Figure 1:
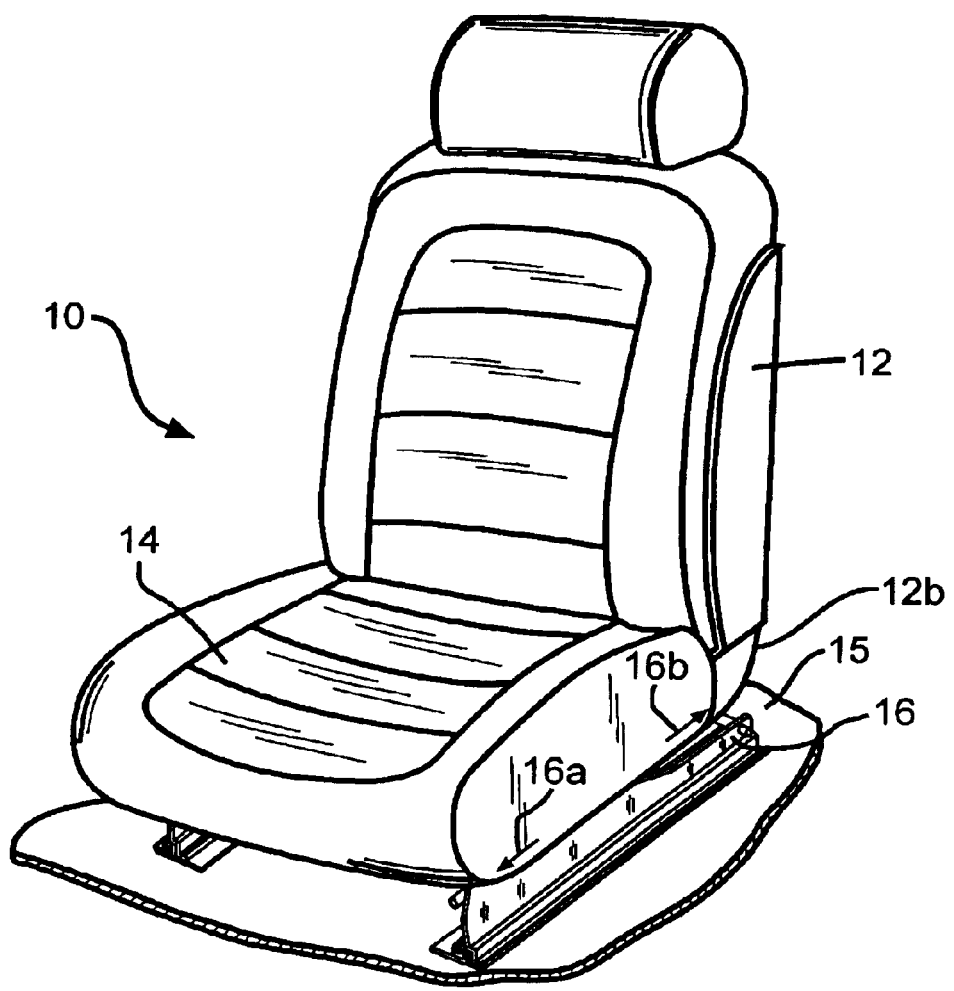
FIG. 1 is a perspective view of a vehicle seat supported on an adjustable seat track assembly.

Referring now to the drawings, there is illustrated in FIG. 1 a vehicle seat indicated generally at 10. The vehicle seat 10 has a seat back 12 and a seat bottom 14. The seat bottom 14 can be slidably mounted relative to the vehicle frame, or floor 15, by a seat track adjuster or assembly 16 in accordance with the present invention. The seat track assembly 16 can be connected to the vehicle floor 15 or to any suitable portion of the vehicle, such as a vehicle frame member, by any suitable means, such as by bolts or threaded fasteners. As will be explained below, the seat track assembly 16 has first and second portions movable relative to each other for moving the seat 10 relative to the floor 15 of the vehicle. The first portion is operatively connected to the floor 15 of the vehicle, or any other structural member, and the second portion is operatively connected to the seat 10. This allows the vehicle seat 10 to slidably move fore 16a and aft 16b relative to the vehicle floor 15 such that a seat occupant can position the seat 10 a desired distance from the vehicle instrument panel, steering wheel, and foot pedals (not shown) or position the seat 10 for maximum comfort and convenience. Preferably, the vehicle seat 10 has a pair of seat track assemblies 16, one for each side of the seat 10. It is understood, however, that the seat 10 can include any number of seat track assemblies 16, such as a single seat track assembly 16 that would preferably be located near the center of the seat bottom 14. It should also be understood that the seat track assembly 16 may be oriented in a position other than that shown in the figures. It can be appreciated, additionally, that the seat can be moved along multiple axes such as: 1) fore and aft; 2) front elevation; and 3) rear elevation. However, this list is not meant to limit or restrict any axes of adjustment the seat 10 is capable of having.

Figure 2:
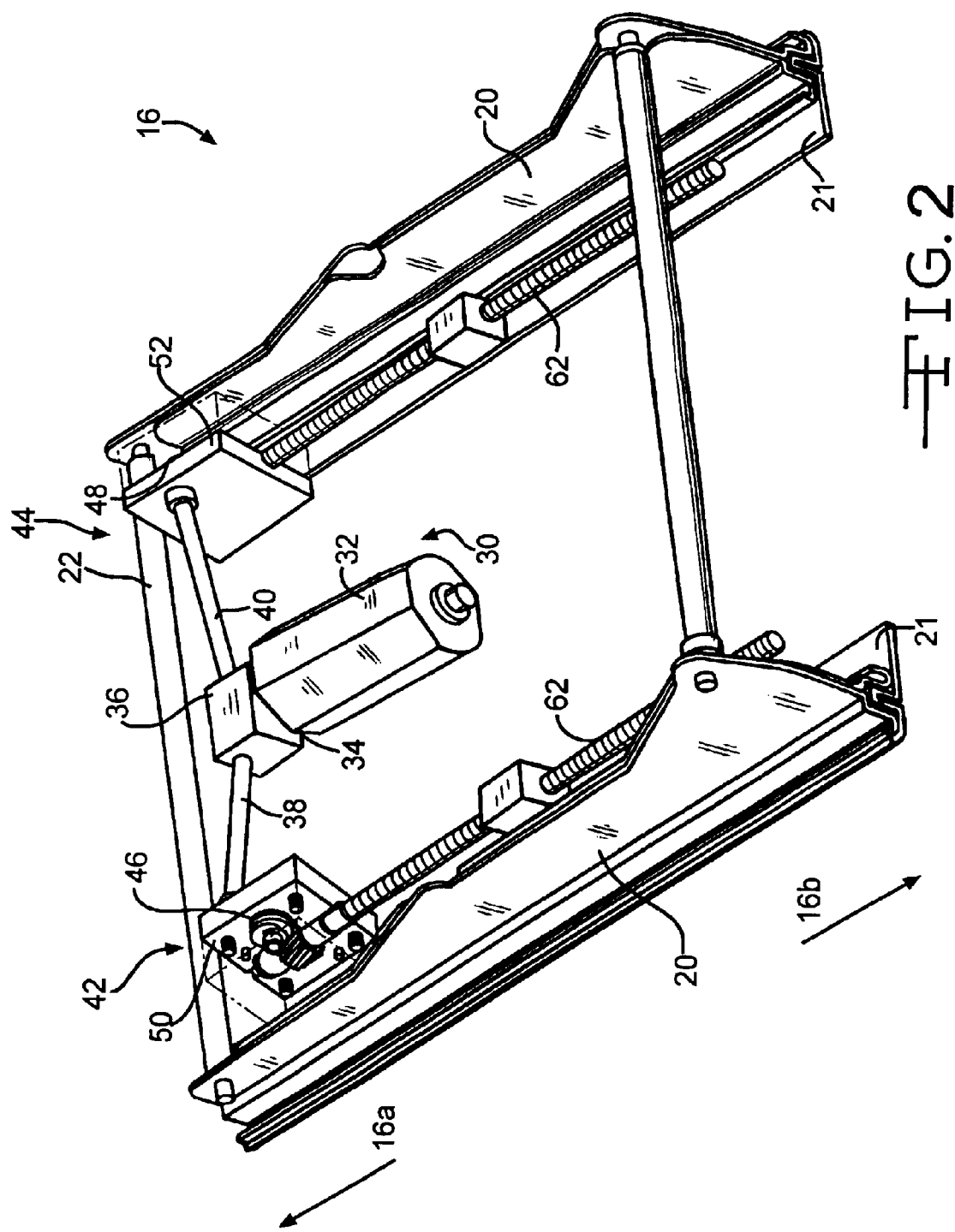
FIG. 2 is a perspective view of a vehicle seat track assembly including an vehicle seat adjuster.

There is illustrated in FIG. 2 the seat adjuster 16 according to the present invention, which includes a pair of generally parallel, spaced apart upper tracks 20. The upper tracks 20 engage with and slide relative to lower tracks 21 to provide fore and aft directional movement 16a, 16b of the seat. The lower tracks 21 are fixedly mounted relative to the floor 15 of the vehicle in which the seat 10 is installed. The upper tracks 20 preferably include a plurality of rods 22 and 24 that connect the upper tracks to each other. The ends of the rods 22 and 24 can be rotatably mounted on the upper tracks 20 and can be used for elevational movement of the seat bottom relative to the seat tracks. However, for the purpose of clarity, a seat elevation mechanism is not shown or described in detail herein.

The seat adjuster 16 further includes a motor assembly, indicated generally at 30. The motor assembly 30 includes an electric motor 32 which drives an output shaft 34 connected to a gear box 36. The motor 32 is preferably a reversible drive motor in that it is operable to rotate the output shaft 34 in either of the rotational directions. A pair of driven shafts 38 and 40 are connected to the gear box 36. The gear box 36 rotatably couples the output shaft 34 to both the driven shafts 38 and 40. The rotatable coupling of the shafts 34, 38, and 40 can be a one-to-one ratio or can have any other suitable relationship. The motor assembly is shown as having a single motor 30 with two drive shafts 38 and 40 connected thereto. It can be appreciated, however, that a pair of motors (one for each transmission assemblies 42 and 44) could be used. In such an embodiment, the output shafts of the motors could drive the threaded shaft without the use of a ninety-degree gear box.

The seat adjuster 16 also includes a pair of transmission assemblies 42 and 44 which are connected to the driven shafts 38 and 40, respectively. The transmission assembly 42 generally houses a transmission 46. In a similar manner, the transmission assembly 44 houses a transmission 48. The transmission assemblies 42 and 44 can be configured to include a single transmission or any number of transmissions. As will be discussed in further detail below, the transmissions 46 and 48 generally control the fore and aft position of the seat bottom 12. It should be appreciated that any number of transmissions could be used to control axes of adjustment other than those axes that are specifically identified herein.

Figure 3:
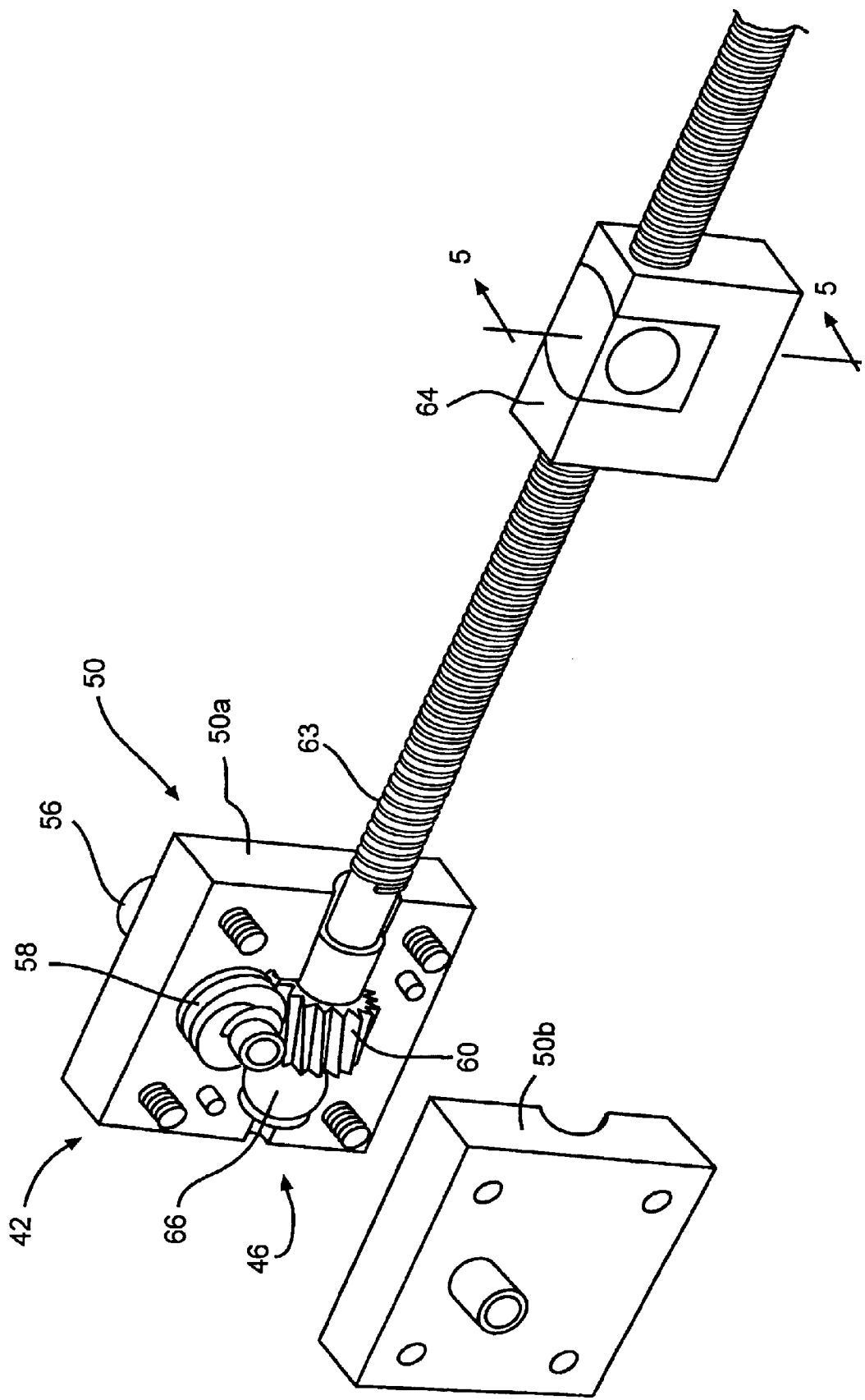
FIG. 3 is a partially exploded view of a transmission assembly used with the vehicle seat adjuster according to the present invention.

The transmission 46 and 48 are shown in FIG. 2 as being positioned within housings 50 formed by a pair of connected blocks 50a and 50b. It should be appreciated that any type of cover, or no cover could also be used with the transmissions 46 and 48 without departing from the scope of the invention. The transmission assemblies 42 and 44 are similar in function and structure, therefore, the portion of the invention as shown in FIGS. 2 and 3 are described with respect to only one of the pair of transmission assemblies 42 and 44. It also should be appreciated that any suitable transmission assembly can be used in conjunction with the present invention. Referring now to FIG. 3, there is illustrated a partially exploded view of the transmission assembly 42. The transmission assembly 42 includes a housing 50 having a pair of blocks 50a and 50b which cover the transmission 46. The housing 50 can be made of any suitable material and is preferably composed of two separate parts joined together. The housing 50 is preferably generally fixed and does not rotate. Additionally, the housing 50 is preferably mounted with the upper track 20 for movement (fore and aft) therewith.

As shown in FIG. 3, the transmission assembly 42 includes an adapter 56 for operatively connecting the transmission 46 to the driven shaft 38 from the gear box 36. For example by a rigid shaft or flex cable/shaft arrangement can be used to drive the transmission 46. If desired, the adapter 56 and the driven shaft 38 can be integrally formed together. The adapter 56 is rotatably connected with a threaded worm shaft 58. The worm shaft 58 extends from the adapter and into the housing 50. The worm shaft 58 is preferably adapted to cooperate with a gear 60 such that operation of the motor 30 will turn the output shaft 34 which drives the drive shaft 38. The drive shaft 38 then turns the worm shaft 58 which in turn causes the gear 60 to also rotate. The gear 60 is positioned at one end of a threaded shaft 62 such that the shaft 62 is rotatably driven by the movement of the gear 60 and worm 58. The purpose of the threaded shaft 62 will be described below. It is preferred that the shaft 62 is generally cylindrical, elongated and passes through drive block 64. The gear 60 can be formed separately from, or integrally with the shaft 62. An end cap 66 is preferably positioned at the end of the shaft 62 adjacent the gear 60 such that the gear 60 remains in a relatively fixed position relative to the housing 50 and worm shaft 58. It is preferred that the transmission assembly 42 be adapted to cause an input shaft 38 to translate rotational power to a shaft 62 that is generally perpendicular to the input shaft 38. It can be appreciated that any suitable type of transmission assembly can be used for such translation.

Referring to both FIGS. 2 and 3, the operation of the seat adjuster 16 will be described next. The seat adjuster 16 includes a seat control mechanism (not shown) for controlling the fore and aft position of the seat bottom 12. The seat control mechanism is operatively connected to the motor 30 (and in turn to transmission assemblies 42 and 44) for controlling the fore and aft seat axes or directional movements 16a and 16b. To accomplish this, the seat adjuster 16 includes a threaded shaft 62. The gear 60 of the transmission 46 is coupled to the threaded shaft 62 for rotational movement therewith. The threaded shaft 62 is threadably engaged with a threaded bore of a drive block 64. The drive block 64 is preferably operatively mounted on the lower track 21 of the seat adjuster 16 or to the floor 15 of the vehicle. Rotation of the gear 60 rotates the threaded shaft 62 thereby causing translation of the drive block 64, which causes fore or aft movement of the seat bottom 12 (depending on the direction of rotation of the shaft 62). Although the seat adjuster 16 can function with a single seat control mechanism, the seat adjuster 16 preferably includes a pair of synchronized seat control mechanisms for controlling the fore and aft position of each track assembly. For example, as shown in FIG. 2, the seat adjuster includes a threaded shaft 62 and drive block 64 connected to the transmission 48 in a similar manner as the connection between the threaded rod 62, block 64, and transmission 46. Thus, the transmissions 46 and 48 are preferably synchronized with each other. It should be understood that the seat control mechanism can be any suitable device that is capable of activating the motor 30 for moving the seat bottom between seat axes in the directions 16a and 16b. It is further preferred that the seat control mechanism(s) are connected to a single switch that is preferably accessible to the occupant of the seat such that the seat can be adjusted by the occupant while in the seat.

Referring now to FIG. 4, there is illustrated an exploded view of the drive block 64. The drive block 64 is preferably formed of three-pieces and forms a generally rectangular block when assembled. The drive block 64 is adapted to receive the threaded shaft 62 in a bore that is formed through the block 64. As described above, as the transmission 46 causes the threaded shaft 62 to rotate, the drive block 64 (attached to the lower track member 21) will cause the upper seat track 20 to move fore or aft relative to the lower track member 21. The housing portion 68 of the drive block includes a base 74 with a first arm 76 extending generally perpendicularly from the base 74. The first arm 76 preferably has a first bore 80 formed therethrough. Also extending from the base 74 is a second arm 78 that is generally perpendicular to the base 74. A second bore 82 is formed through the second arm 78. The outer faces of the first and second arms 76, 78 are generally flat, thereby forming the outer faces of the generally rectangular drive block 64. However, each inner face of the first and second arms 76, 78 are curved to accommodate the isolator 70. It is further preferred that the housing 68 is made of metal to maintain rigidity while supporting the seat frame members and translating a first frame member relative to a second frame member. However, it can be appreciated that any suitable material can be used in accordance with the present invention.

The isolator preferably has a pair of opposed generally vertical sides 100 and a pair of opposed generally horizontal sides 102 that are generally flat. A second pair of opposed generally vertical sides 104 are curved, having a shape that matches the inner faces 106 and 108 of the arms 76 and 78, respectively, of the housing 68. The isolator 70 is preferably sized and shaped so that when the isolator 70 is positioned within the opening between the first and second arms 76 and 78 of the housing 68, the sides 100 and 102 of the isolator 70 are substantially flush with the sides of the housing 68. The isolator also has a first bore 84 formed through it. The first bore 84 is preferably substantially aligned with the first bore 80 formed in the first arm 76 and with the second bore 82 formed in the second arm 78. The isolator 70 preferably also has a second bore 86 formed therethrough. The second bore is generally orthogonal to the first bore 84 of the isolator 70 and is also adapted to receive a nut 72. It should be appreciated that the first bore 84 of the isolator 70 and second bore 86 of the isolator 70 can have the same or different dimensions.

It is preferred that the second bore 86 of the isolator 70 is sized to receive a nut 72 therein. The nut 72 is generally cylindrical in shape and has a bore 88 formed through it. The bore 88 of the nut 72 is preferably threaded such that the threads 90 correspond to the threads 63 of the shaft 62. Thus, when the shaft 62 rotates, the threads 63 and 90 cause translation of the drive block 64 relative to the shaft 62. It is further preferred that the nut 72 be made of metal. Particularly, with a metal nut 72, the threads will more securely engage the threads of the shaft 62. Additionally, the metal threads of the metal nut will be less likely to be stripped, such as could occur due to wear as well as due to a vehicle accident wherein a large sudden force causes movement of the shaft 62 relative to the drive block 64 without rotation of the shaft 62. The operation of the three-piece drive block 64 will be described next.

The drive block 64 is used to control the movement of the seat adjuster components relative to each other (as described above). However, the drive block 64 according to the present invention is also used to limit shaft 62 vibration through the drive block 64 as well as to control the alignment of the shaft 62 and the drive block 64. The respective principle rotation axes 92, 94, and 96, are orthogonal to each other creating the effective degrees of freedom for the drive block assembly 64, thus resulting in the self-aligning capability. This feature is similar to a universal joint used with a driveshaft in a vehicle. The rotating shaft (shaft 62 in the seat adjuster 16) can be out of perfect alignment and still transmit torque. The shape of the isolator 70 allows alignment to be maintained. The isolator can pivot in at least two axes 96 and 92, for example, as shown by arrow 98. Such pivoting action will allow the shaft 62 to remain substantially aligned through the bore 80 of the first arm 76, the bore 82 of the second arm 78, and the first bore 84 through the isolator 70 in a horizontal direction. Additionally, to further control alignment of the shaft 62 and drive block 64, the nut 72 within the isolator 70 is generally cylindrical in shape. This will allow rotation of the nut 72, and thus the shaft 62, in at least two axes 92 and 94, for example, as shown by directional arrow 100. Such pivoting motion will allow the shaft 62 to remain substantially aligned through the bore 80 of the first arm 76, the bore 82 of the second arm 78, and the first bore 84 through the isolator 70 in a vertical direction. By aligning the shaft 62 with the drive block 64, there can be a reduction in binding or squealing caused by horizontal (axes 92 and 96) misalignment and vertical (axes 92 and 94) misalignment. A conventional drive block, typically adjusts only in a single axis. A standard gimbal can have the same degrees of freedom as the drive block 64. However, a standard gimbal typically is sensitive to build variation and more often transmits shaft vibration through the system causing noise and vibrations that are undesirable to the occupant of the seat. The isolator 70 according to the present invention should allow for more generous tolerances while still effecting a relatively tight joint.

In a preferred embodiment, the isolator 70 is made of a plastic material, for example a urethane material. The use of a urethane material in the isolator 70 allows the isolator 70 to more easily move relative to the housing 68. Additionally, the nut 72 can pivot more easily within the isolator 70 when the isolator 70 is made of a urethane material. A urethane isolator 70 can absorb a greater amount of vibration than a steel component. Conventional steel gimbals can move in three dimensions, but can be difficult to manufacture because of the metal to metal contact. This also can cause the components to rattle and chuck. A three-piece drive block, with an isolator made of a urethane material, has relatively lower vibration transmissivity than one that is steel on steel. Steel gimbals are also more difficult to align whereas a urethane isolator can move more easily within the degrees of freedom of the drive block 64, thus enhancing the ability for the shaft 62 to remain aligned within the drive block 64.

Illustrated in FIG. 5 is a cross-sectional view of the drive block 64 and shaft 62 through line 5—5 of FIG. 4. As can be more clearly seen, the shaft 62 passes through the bore 88 of the nut 72. The threads 90 of the nut 72 threadably engage the threads 63 of the shaft 62 for rotation therewith. The shaft 62 also passes through the bore 80 of the first arm 76 of the housing 68, the bore 82 of the second arm 78 of the housing 68, and the first bore 84 of the isolator 70. It is preferred that the diameters of the bores be slightly larger than the diameter of the shaft 62 so that some misalignment can be accommodated by the drive block assembly 64. However, as described above, it is preferred that the function of the drive block 64 be such that the three-piece drive block 64 acts to alleviate the misalignment (by movement of the three pieces of the drive block 64) and allow rotation of the shaft 62 relative to the drive block 64.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle seer adjuster mechanism comprising:

a first track member attached to one of a vehicle frame and a vehicle seat;

a second track member attached to the other of the vehicle frame and the vehicle seat, the second track member being slidably movable relative to the first track;

an electrically controlled drive mechanism for moving the second track member;

wherein the drive mechanism includes a threaded shaft connected with the second track member, a drive block attached to the first track member and threadably engaged with the threaded shaft; and the drive block including:

a housing;

an isolator pivotally mounted to the housing;

a nut pivotally mounted on the isolator, the nut threadably engaging the shaft thereby limiting shaft vibration through the drive block as well as controlling the alignment of the shaft and the drive block.

2. The mechanism defined in claim 1 wherein the housing has a pair of opposed arms defining an opening therebetween, the arms having a first bore formed therethrough;

the isolator has a second bore and third bore formed therethrough, the isolator being sized to fit within the opening formed between the arms of the housing;

the nut has a fourth bore formed therethrough, the nut being sized to fit within the third bore of the isolator; and the second bore of the isolator, the fourth bore of the nut, and the first bore of the arms being substantially in alignment.

3. The mechanism defined in claim 2 wherein the threaded shaft passes through the first bore of the arms, the second bore of the isolator, and the fourth bore of the nut.

4. The mechanism defined in claim 2 wherein a surface of the arms of the housing defining the opening have a generally arcuate shape.

5. The mechanism defined in claim 4 wherein the isolator has a pair of opposed sides having an arcuate shape that generally corresponds to the arcuate shape of the surface of the arms of the housing, a first pair of opposed sides having a generally flat shape, and a second pair of opposed sides having a generally flat shape.

6. The mechanism defined in claim 2 wherein the nut and the third bore of the isolator are generally cylindrical.

7. The mechanism defined in claim 1 wherein the isolator is made of plastic.

8. The mechanism defined in claim 1, wherein the isolator is made of urethane.

9. The mechanism defined in claim 1 wherein the nut and the housing are made of metal.

10. The mechanism defined in claim 1 wherein the nut is rotatable in at least a first axis.

11. The mechanism defined in claim 10 wherein the isolator is rotatable in at least a second axis.

12. The mechanism defined in claim 11 wherein the first and second axes are orthogonal to each other.

13. The mechanism defined in claim 12 wherein the first and second axes are orthogonal to the axis of the threaded shaft.

14. The mechanism defined in claim 1 wherein the housing is fixed relative to the first track member.

* * * * *